Sept. 15, 1942.  G. GASTRICH  2,295,782
METHOD AND MEANS FOR PRODUCING KNITTED ARTICLES
Filed Oct. 8, 1937  12 Sheets-Sheet 1
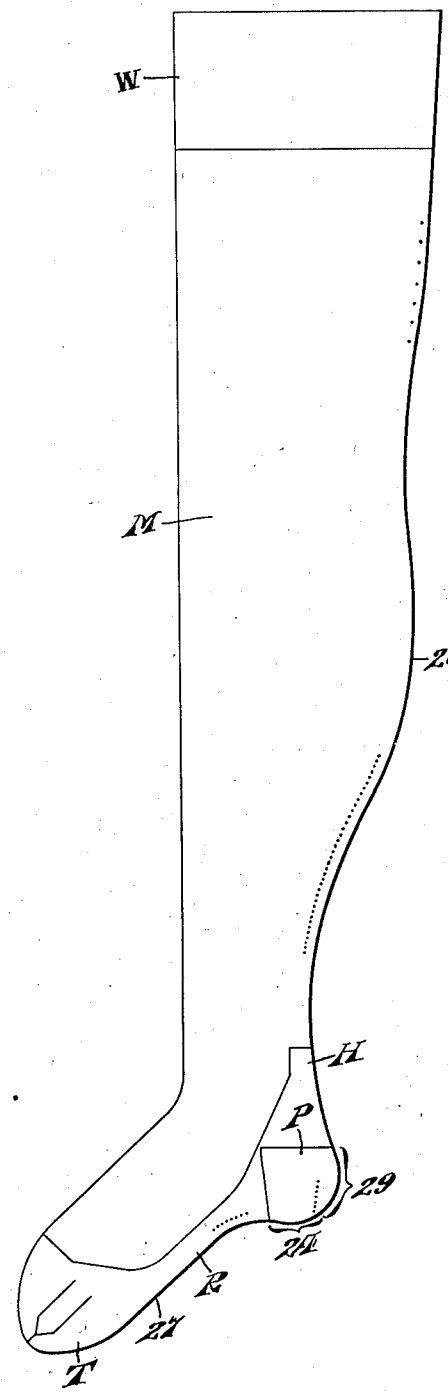
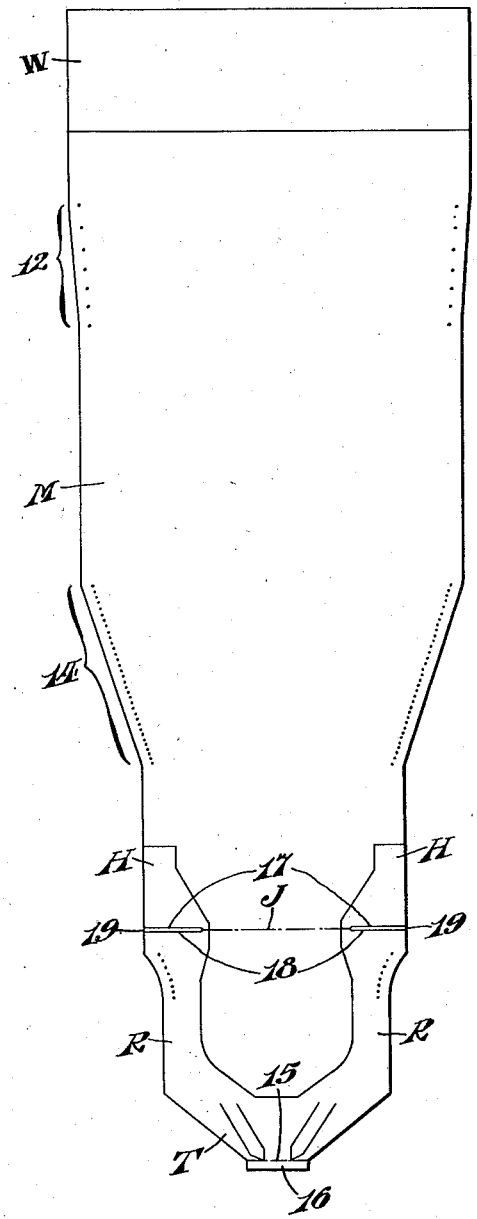
INVENTOR:
Gustav Gastrich,
BY
Alfred E. Eschinger
ATTORNEY.

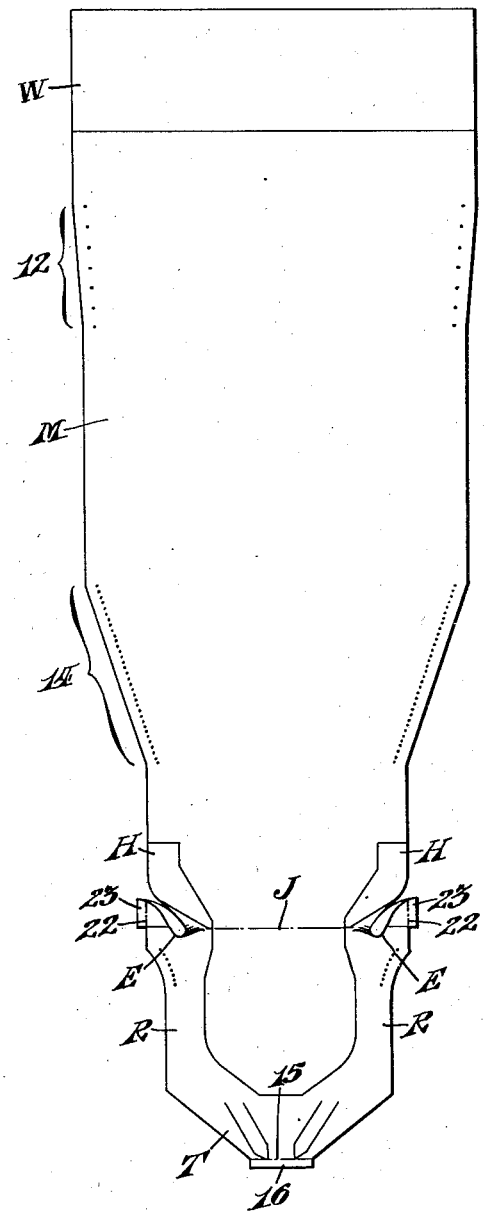

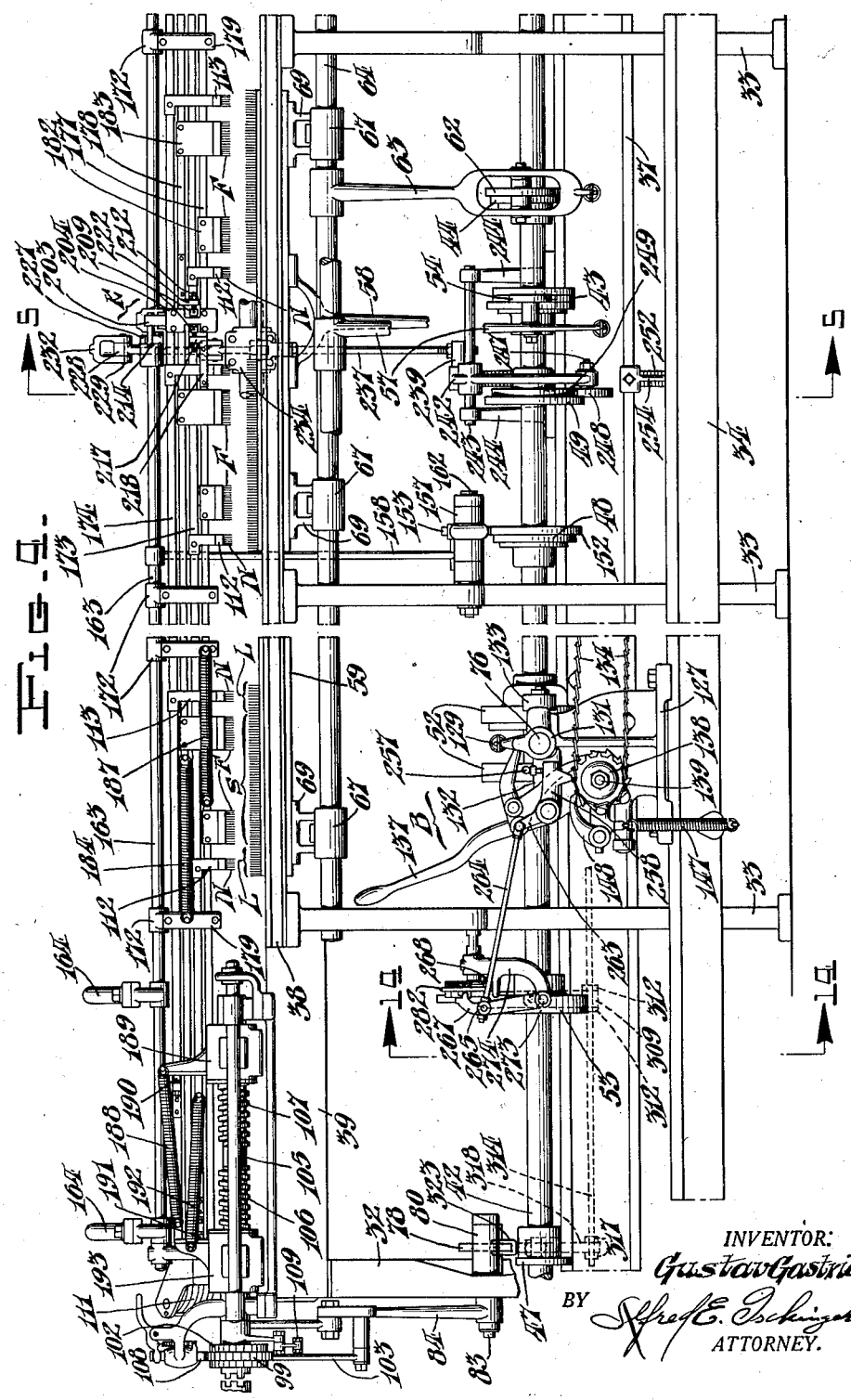

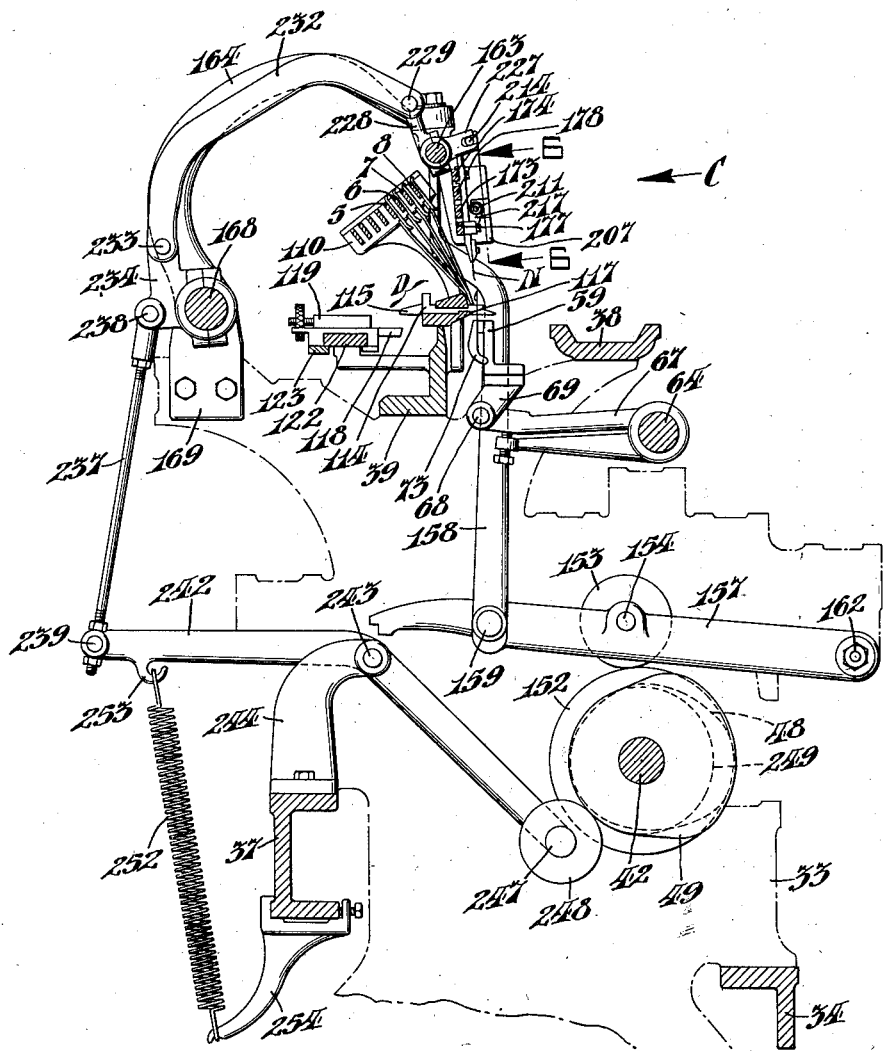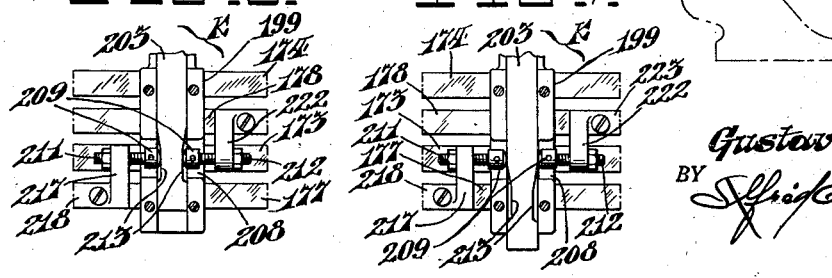

Sept. 15, 1942. G. GASTRICH 2,295,782
METHOD AND MEANS FOR PRODUCING KNITTED ARTICLES
Filed Oct. 8, 1937 12 Sheets-Sheet 5
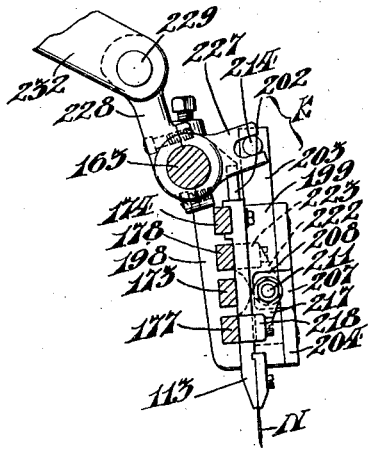
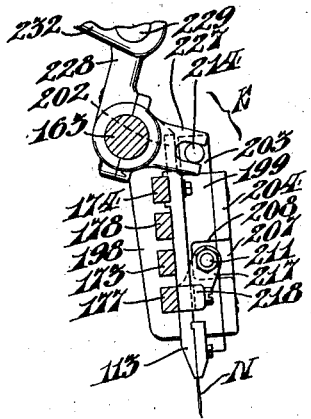
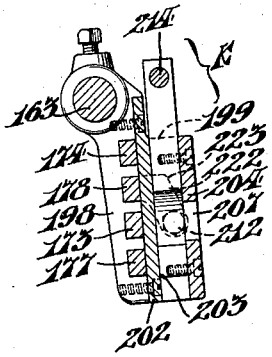
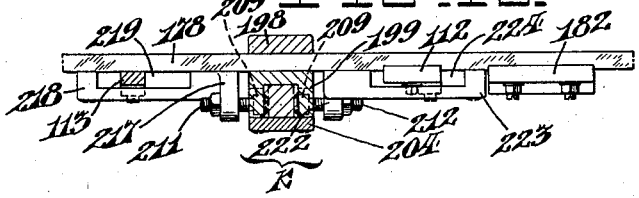
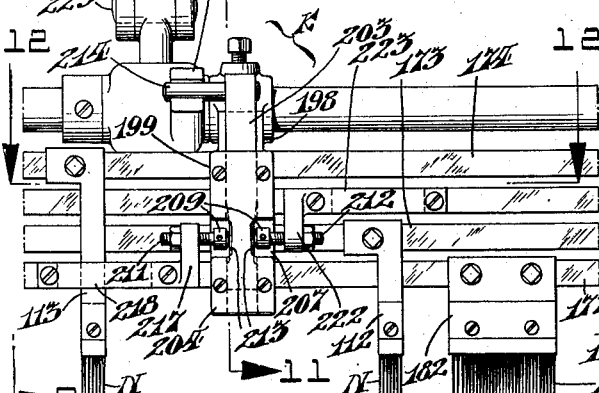
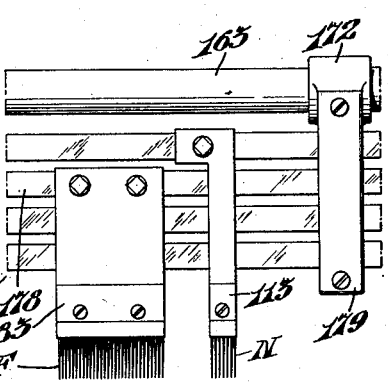
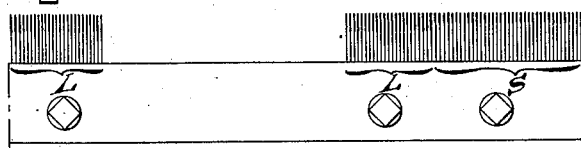
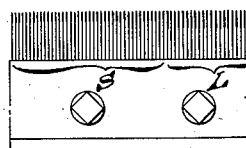
INVENTOR:
Gustav Gastrich,
BY [signature]
ATTORNEY.

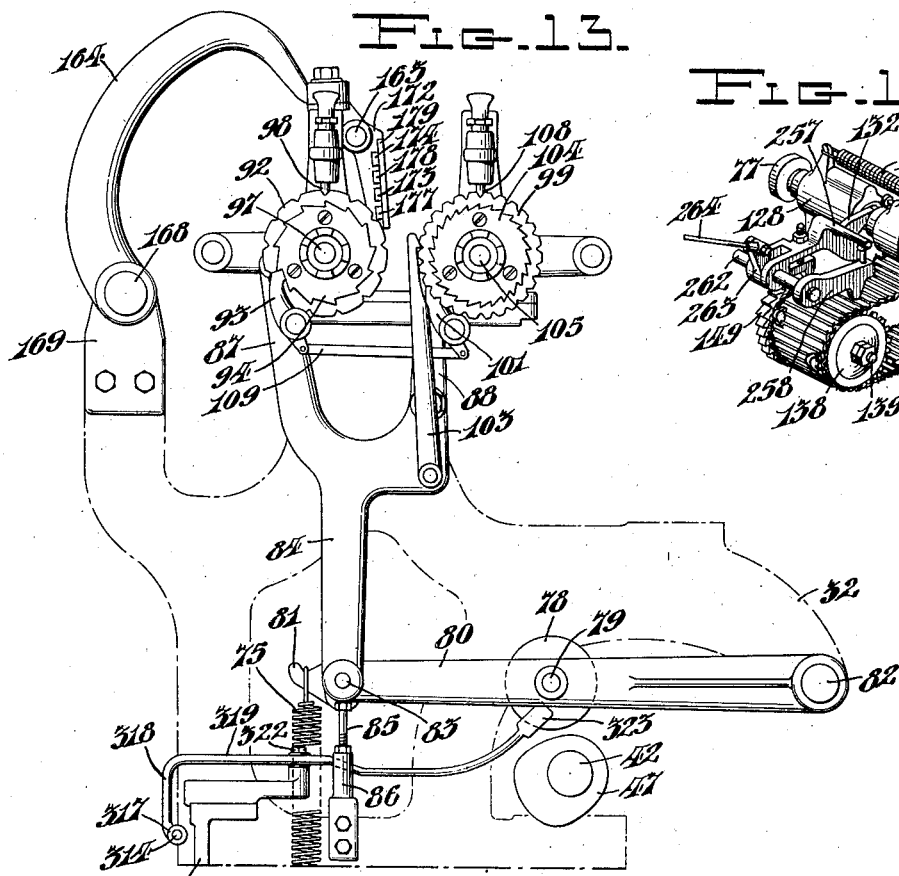
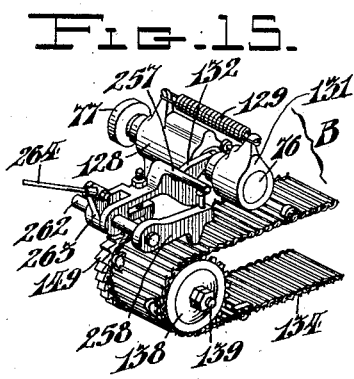
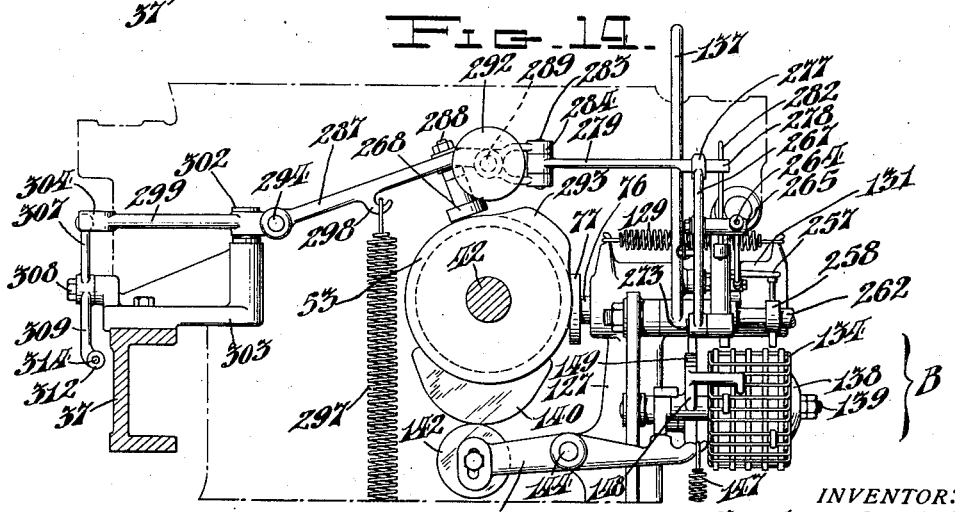

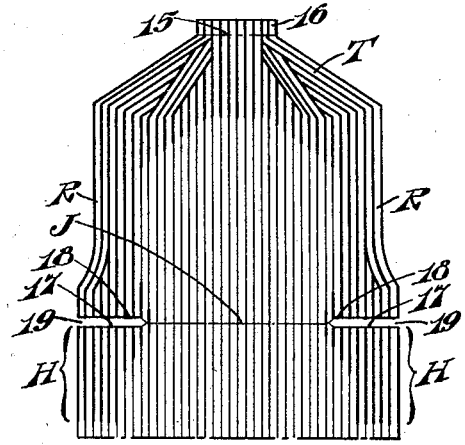
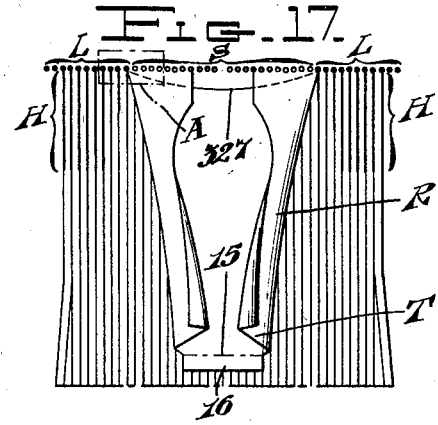
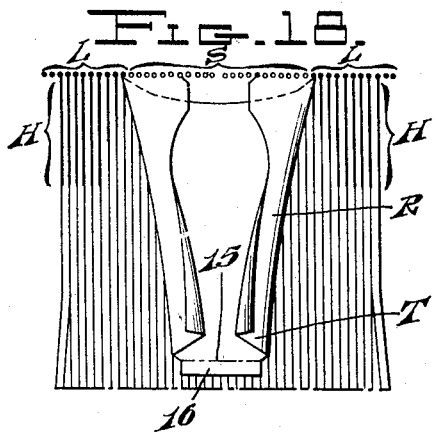
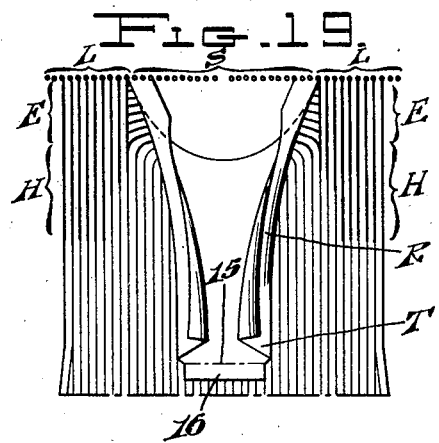
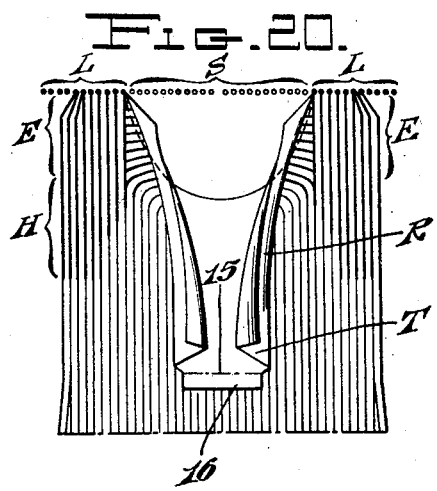
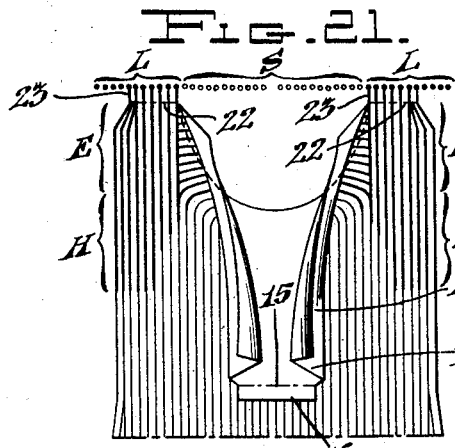

Sept. 15, 1942.   G. GASTRICH   2,295,782
METHOD AND MEANS FOR PRODUCING KNITTED ARTICLES
Filed Oct. 8, 1937   12 Sheets-Sheet 8
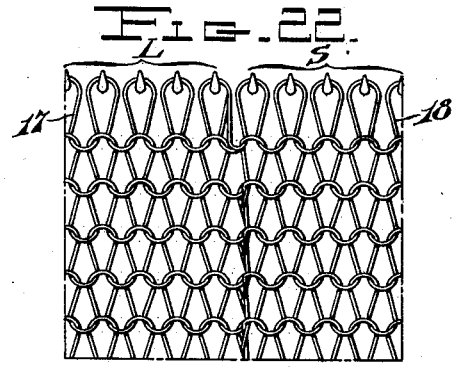
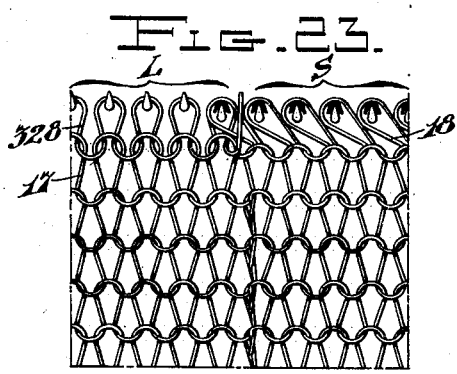
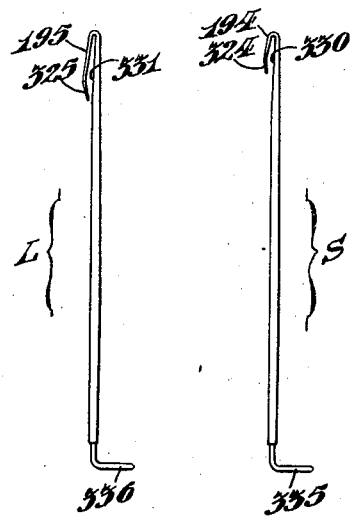
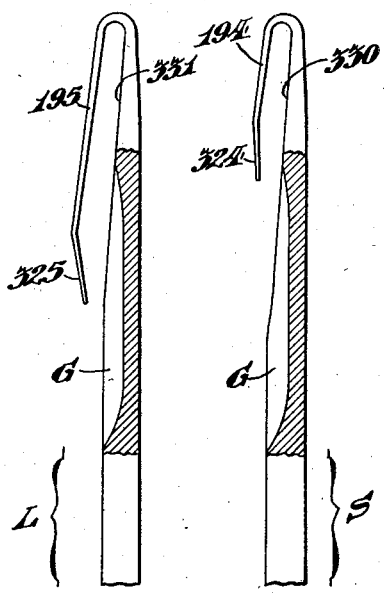
INVENTOR:
Gustav Gastrich,
BY Alfred E. Ischinger
ATTORNEY.

Sept. 15, 1942.   G. GASTRICH   2,295,782
METHOD AND MEANS FOR PRODUCING KNITTED ARTICLES
Filed Oct. 8, 1937   12 Sheets-Sheet 9
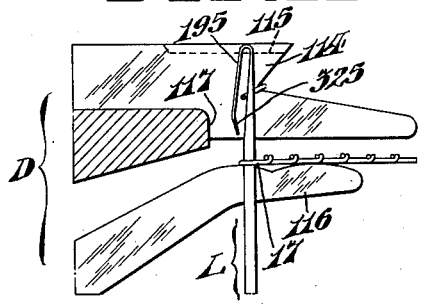
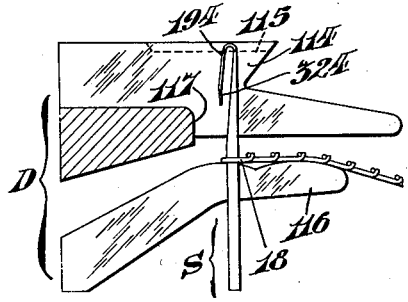
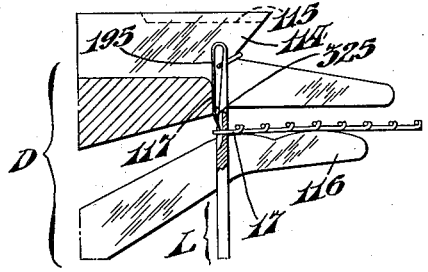
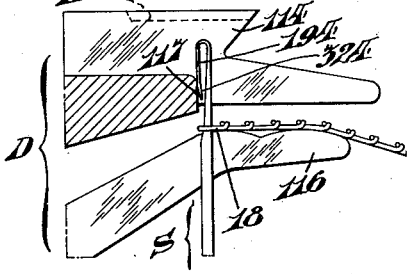
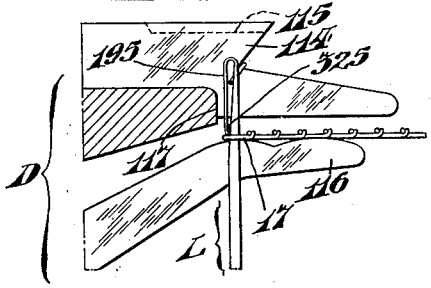
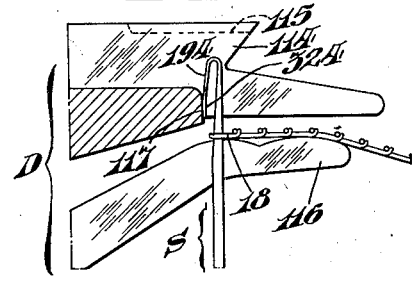
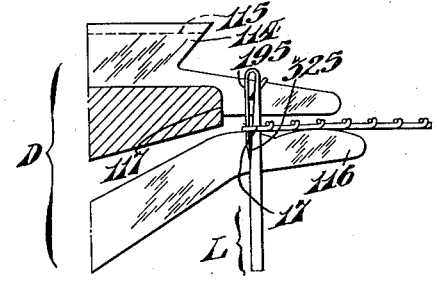
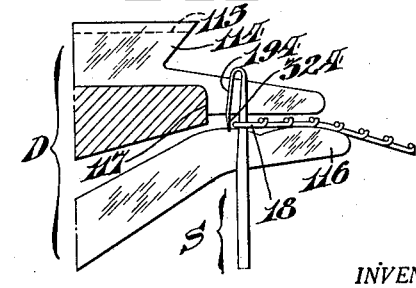
INVENTOR:
Gustav Gastrich,
BY Alfred E. Ischinger
ATTORNEY.

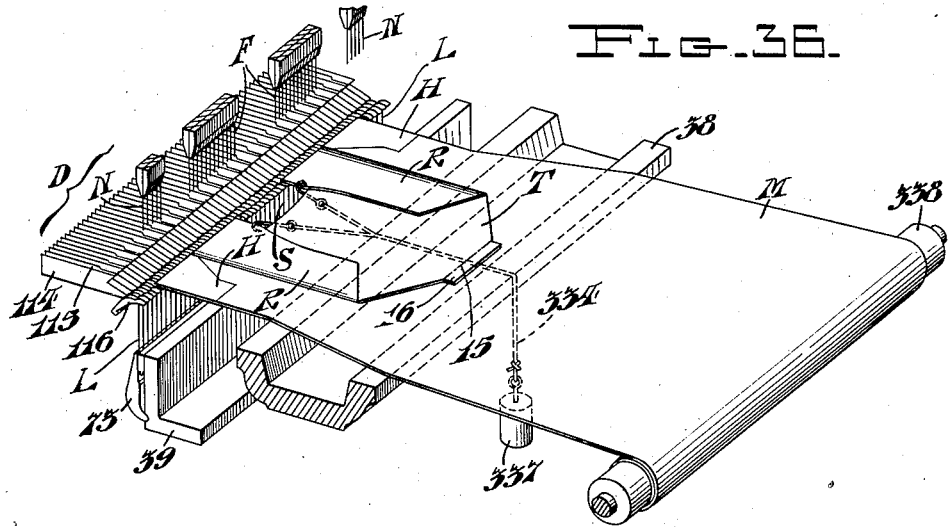
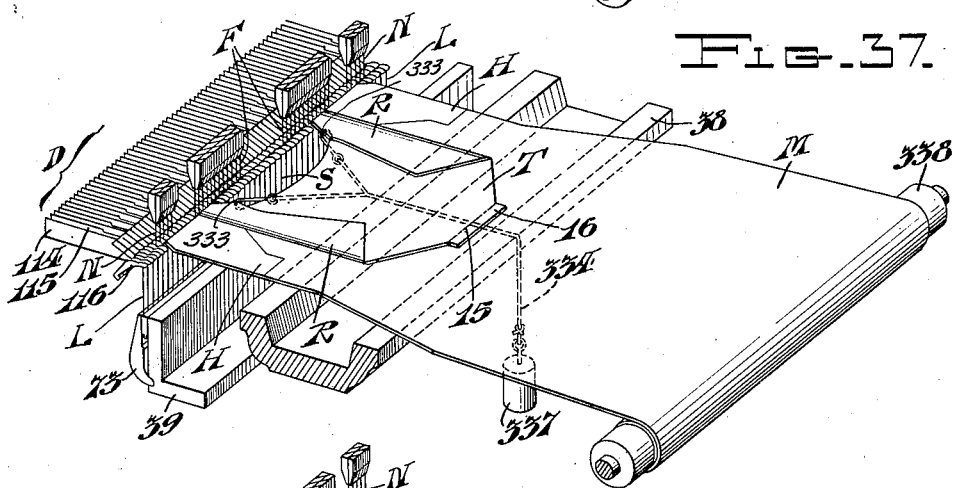
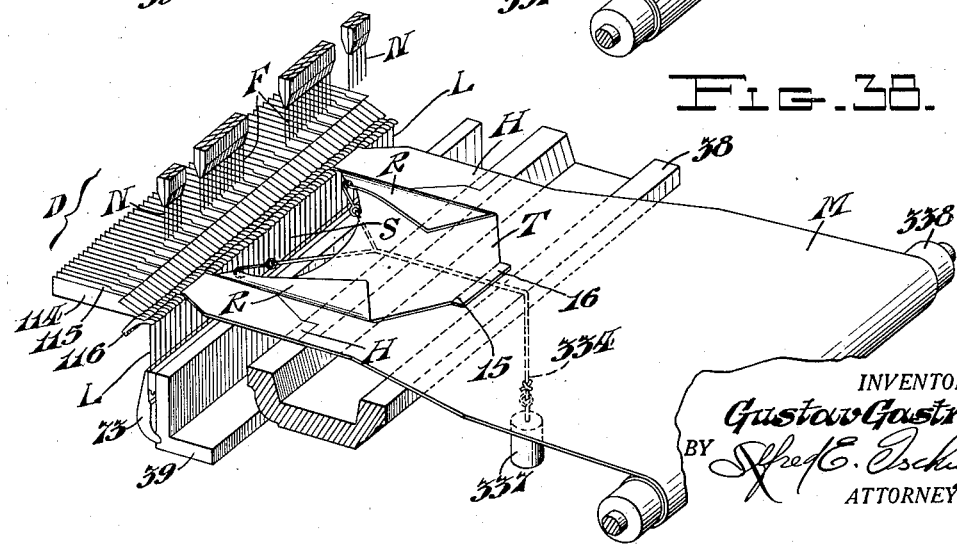

Sept. 15, 1942. G. GASTRICH 2,295,782
METHOD AND MEANS FOR PRODUCING KNITTED ARTICLES
Filed Oct. 8, 1937 12 Sheets-Sheet 11
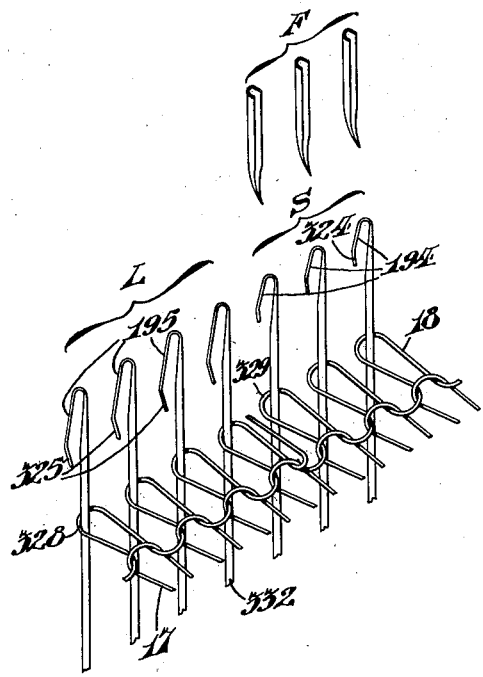
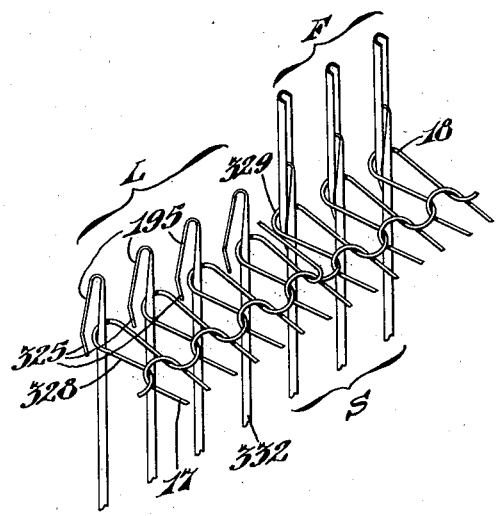
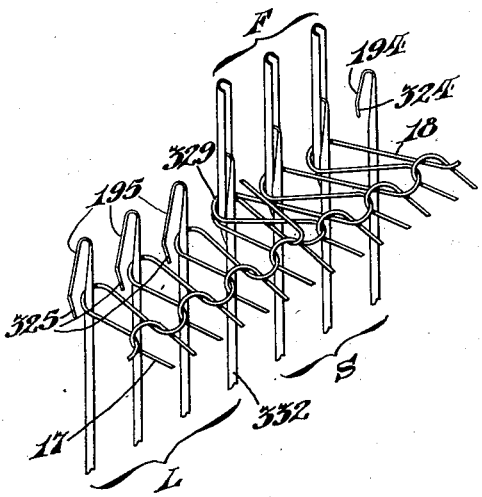
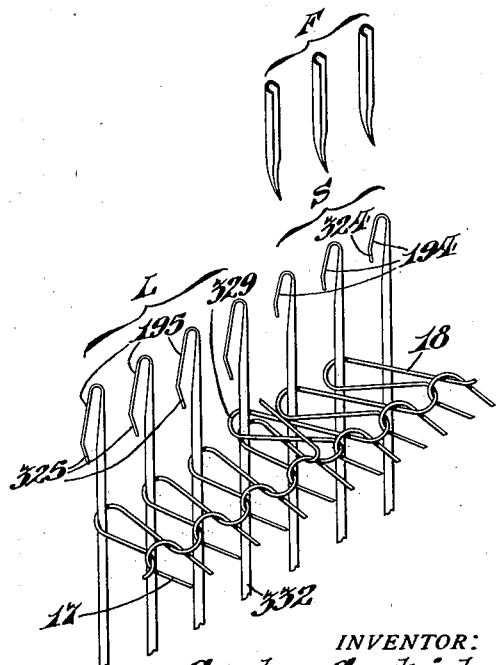
INVENTOR:
Gustav Gastrich,
BY Alfred E. Dschinger,
ATTORNEY.

Sept. 15, 1942.  G. GASTRICH  2,295,782
METHOD AND MEANS FOR PRODUCING KNITTED ARTICLES
Filed Oct. 8, 1937  12 Sheets-Sheet 12

INVENTOR:
Gustav Gastrich,
BY  Alfred E. Tschinger,
ATTORNEY.

Patented Sept. 15, 1942

2,295,782

UNITED STATES PATENT OFFICE 2,295,782

METHOD AND MEANS FOR PRODUCING KNITTED ARTICLES

Gustav Gastrich, Wyomissing, Pa., assignor to Textile Machine Works, Wyomissing, Pa., a corporation of Pennsylvania Application October 8, 1937, Serial No. 167,958

3 Claims. (Cl. 66—82)

My invention relates to a method of, and means for, shaping a knitted fabric, and particularly to such method and means as applied to the production of a half heel pocket portion, and the like, of a full fashioned stocking blank, or other article.

Heretofore, it has been usual, in forming a knitted fabric portion, such as a portion at each side of a full fashioned stocking blank constituting half of the cup-like heel pocket of the completed stocking, to knit an area or areas, such as the welt, leg and portions of the heel, on one machine, such as a "legger," and the remainder on a machine, such as a "footer." The latter method has well known disadvantages, such as causing loss of time, excess labor, and bad matching between the parts of the fabric knitted on the respective machines.

Efforts to overcome these disadvantages, and to produce the entire fabric or blank on a single machine, have encountered considerable difficulty and expense, with the result that further expedients have been attempted.

One of the latter resides in knitting all of a full fashioned stocking blank, except the heel pocket portion, on one machine, separately knitting half heel pocket elements, on another machine, topping the heel pocket elements in position on the blank, and stitching the topped elements in position. The latter method has disadvantages, such as requiring the handling of too many parts, the production and removal of large ravel areas, the use of excess yarn, the performance of too many operations, and the production of a less satisfactory fabric.

Another of the above-mentioned expedients resides also in knitting an entire full fashioned stocking blank, except the heel pocket element, on one machine, knitting the pocket in one piece on a separate machine, and topping and sewing the heel pocket in position. This form requires storing and transporting the separate heel pockets, topping them about all of the edges, and the production and removal of large ravel areas.

It is an aim of this invention, in certain aspects, to overcome certain of the above-mentioned disadvantages, by providing a method considerably simpler than the operation of a legger machine and a footer machine, rendering it practical and desirable to provide on one machine all of the blank except the heel pocket elements, and by knitting the latter to the blank, instead of topping and stitching either the elements or a single-piece pocket in place, economizing in the operation, providing a better product, and rendering the invention a general improvement in its field.

Another object of the invention is to so employ long and short beard loop-manipulating implements, and to so operate them in cooperation and combination with the fashioning and loop transferring means as to obtain the above mentioned and other advantages.

Another object of the invention is to provide novel means for simultaneously operating a plurality of loop-manipulating needle, or needle-like, implements whereby certain loops thereon are cast off, while others remain on or are prevented from being cast off, the implements.

Another object of the invention is to provide a machine, for forming a knitted fabric, comprising a presser edge, and a loop-manipulating mechanism including a bearded implement, whereby, upon predetermined operation of the mechanism, the beard is partially closed by the edge, and opened to prevent press off of a loop, or the machine is provided with means for selectively receiving such implement or an implement having a beard to be closed by the edge to press off a loop, or with implements of both types for the operations thereof aforesaid.

Another object is to provide a loop-manipulating implement, like a needle of the beard type, in which the beard is shorter than the beard of a standard needle, and the implement has other novel individual characteristics, function and result, or novel character in combination with a machine and/or other elements.

Another object is to avoid press off of a loop from an implement of the bearded needle type, as by providing a tapered surface on the beard side of the shank of greater extent toward the butt end of the implement than a corresponding tapered surface of a standard needle of the same type, whereby to obtain advantages of the longer tapered surface either in its individual effect or in its effect operating in combination with a machine and/or other elements.

Another object is to provide a novel operating feature in a knitting machine whereby needle-like implements operating simultaneously through like cycles are affected differently and produce different results.

Another object of the invention is to produce an improved product of the above indicated character.

Another object of the invention is to provide novel selvage loop forming and connecting means, and to adapt the same for ready application to existing machines, without undue alteration, addition and expense.

A further object of the invention is to provide a machine, for knitting an insert into a previously knitted blank by the method herein set forth, that shall be simple and durable in construction, economical to manufacture, and effective in its operation.

By the invention, a fabric, such as a full fashioned stocking blank, is knitted and formed to have, at each side in the heel region, a plurality of course portions, such as course portions of loose loops; these portions being formed to lie substantially in coursewise alignment for topping onto needle-like implements of a knitting machine, as by first knitting them in walewise register, either separately or joined by a severing course or courses, and folding the blank to place them in such alignment. The invention, in addition to its novel character in connection with the production of full fashioned hosiery, contemplates its application to other fabrics, as in the manufacture of underwear, swimming suits and the like, where simultaneous operations at opposite sides of a blank, as above mentioned may be effected, or, since these operations are duplicates, one operation may be effected in accordance with certain phases and contemplation of the invention, without the accompanying operation being performed.

The aligned course portions are topped onto adjacent groups of needle-like implements, as of the beard type, in which one group has long beards and another has short beards, and knitting is resumed from the one course portion, such as from the loops on the long beard needles, while the implement group of the other course portion, or of the loops on the implements having the short beards, receives no yarn. This second knitting operation is effected for a given number of course portions, during which narrowing is also effected in selected courses, and loops are successively transferred from the other course portion, or from the short beard implements, to loops of the additionally knit part or insert, as at the inside selvage edge where the part is a heel tab of a full fashioned stocking; the transferred loops being interknit to selected loops of the additionally knit part and, in one form of the invention, being of smaller number than the given number of course portions substantially uniformly distributed throughout the length of the part. Where the resultant fabric is to be tubular, and two of the aforesaid additionally knit parts are provided at opposite sides of a blank, as in a full fashioned stocking, and if necessary or desired also, where only one such part is produced, a row of loose loops and a ravel area are provided at the end of the knitting. As in the stocking, the loose loops at the respective blank sides are looped and stitched to each other, after which a short back seam is effected, as from the toe loopings to the thus looped loose loops, and a longer back seam provided from the latter along a portion of the heel pocket and along the leg and welt to the top of the stocking. During the above-described operations, the loops to be transferred are prevented from being cast off the short beard implements, as by having beards open at times when the implements would otherwise cast off the loops, this result being obtained, in the example given, by having the beards shorter than the beards of the adjacent group of needles on which knitting is being effected, and operating all of the implements through usual actions whereby the short beards are not closed by the presser edge at the time the long beard needles are casting off loops.

Novel mechanism, for operation in accordance with the method, comprises, in one example, groups of needle-like implements, as of the bearded type, in which one group has long beards and another has short beards, fashioning means, such as narrowing points associated with one of the needle groups, as of the long beards, and loop transfer means, such as transfer points associated with another of the implement groups, as of the short beards. Also, a slide cam and follower mechanism are provided to shift the transfer points, and other features are present, as will hereinafter appear.

With the above-mentioned, and other, objects in view, which will become apparent from the following detailed description of the illustrative embodiment of the invention shown in the accompanying drawings, my invention resides in the novel elements, features of construction and arrangement of parts in cooperative relationship as hereinafter more particularly pointed out in the claims.

In the drawings:

Figure 1 is a view in outline, and showing major features of a full fashioned stocking produced according to the invention, the stocking, as shown, being in flat folded form;

Fig. 2 is an outline view of a blank on a slightly reduced scale, complete except for the heel tabs, as produced on a single machine, and from which, after the tabs are provided in accordance with the invention, the stocking of Fig. 1 is produced;

Fig. 3 is a view similar to Fig. 2, showing the blank of Fig. 2, plus the heel tabs, as above mentioned, from which the stocking of Fig. 1 is directly produced;

Fig. 4 is a view, in front elevation, parts being omitted, of a machine including the invention;

Fig. 5 is a cross sectional view, parts showing in section, in elevation and in dot-and-dash lines, of the machine structure of Fig. 4, taken substantially along the line 5—5 of Fig. 4;

Fig. 6 is an enlarged detail view, taken substantially along the line 6—6 of Fig. 5, of a transfer point shifting mechanism of the invention, with the parts positioned as at one stage of operation;

Fig. 7 is a view similar to Fig. 6, of the parts thereof positioned as at another stage of operation;

Fig. 8 is an enlarged detail front elevational view of portions of the machine as seen toward the upper right hand side of Fig. 4, or as viewed in the direction of the arrow C of Fig. 5, parts being broken away and omitted;

Fig. 9 is a detail sectional view, taken substantially along the line 9—9 of Fig. 8, showing certain of the parts of Fig. 6, and others associated therewith, as positioned at a corresponding stage of operation;

Fig. 10 is a view similar to Fig. 9, with the parts thereof positioned as at a stage of operation corresponding to the step of Fig. 7;

Fig. 11 is a detail sectional view, taken substantially along the line 11—11 of Fig. 8, of the mechanism of Fig. 6, as positioned therein;

Fig. 12 is a view, partially in section and partially in elevation, taken substantially along the line 12—12 of Fig. 8;

Fig. 13 is an end elevational view, taken from the left of Fig. 4, of parts of the machine structure thereof;

Fig. 14 is a sectional view taken substantially along the line 14—14 of Fig. 4;

Fig. 15 is a detail perspective view of portions of pattern control mechanism shown at the lower right-hand portion of Fig. 14;

Fig. 16 is a diagrammatic view of a portion of the blank of Fig. 2 positioned as it comes off the machine on which it is formed, but with certain course portions severed, as will be hereinafter set forth;

Fig. 17 is a view similar to Fig. 16 of the blank portion of Fig. 2, as folded and conditioned for topping onto the machine of the invention;

Fig. 18 is a view similar to Fig. 17 indicating preliminary progress in knitting or adding heel tab fabric areas to the fabric of Fig. 17, and transferring loops from adjacent sole areas to the inside selvages of the tabs;

Fig. 19 is a view similar to Fig. 18 showing further progress in the production of the fabric or blank to positions intermediate the ends of the heel tabs;

Figure 43:
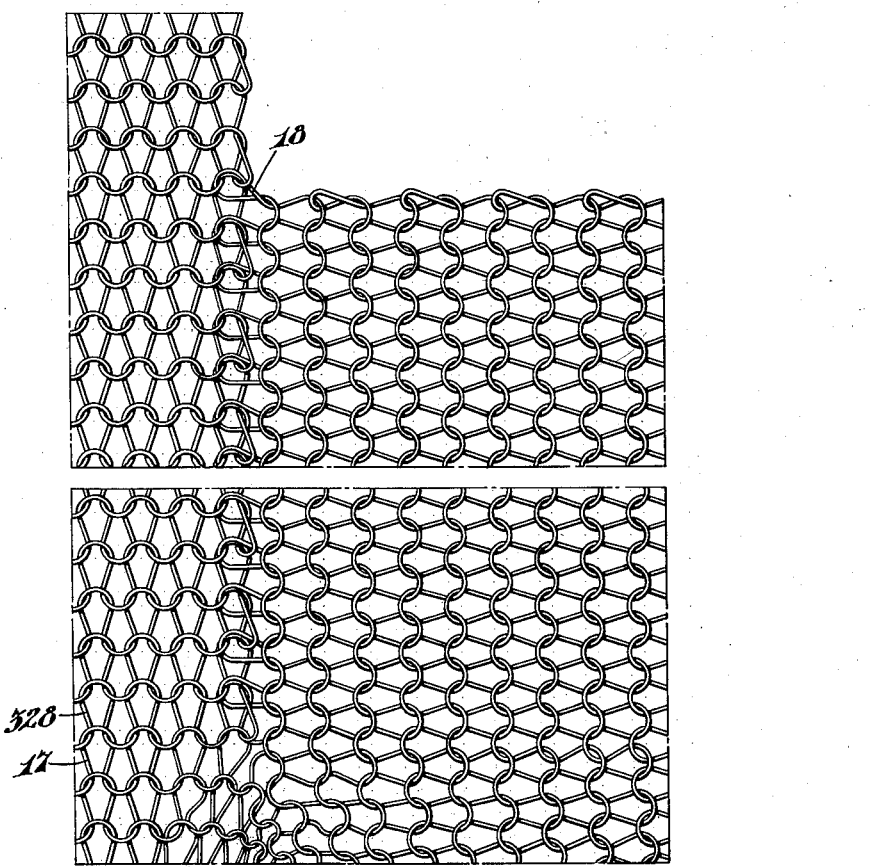

Fig. 20 similarly indicates the completion of the tabs, with ravel courses yet to be added;

Fig. 21 indicates the blank of Fig. 20, after the addition of the ravel courses;

Fig. 22 is a magnified loop diagram of a portion of the fabric enclosed by a dot-and-dash rectangle A of Fig. 17, as conditioned at one stage of production;

Fig. 23 is a similar diagram of the fabric portion of Fig. 22, as conditioned at another stage of production;

Fig. 24 is a view, in side elevation, of a standard full fashioned knitting machine needle, drawn to approximately twice its actual size;

Fig. 25 is a view similar to Fig. 24, and to the same scale, of a short beard needle-like implement of the invention;

Fig. 26 is a greatly magnified view, partially in side elevation and partially in vertical plane section, of the upper portion of the standard needle of Fig. 24;

Fig. 27 is a view similar to, and to the same scale as, Fig. 26 of the implement of Fig. 25, showing the horizontally opposite relation of parts to parts of the standard needle in service;

Fig. 28 is a view showing the position of one of the standard, or long beard, needles relative to adjacent knitting elements near the beginning of a downward stroke of the needle;

Fig. 29 is a similar view of one of the short beard implements at the corresponding stage of operation;

Fig. 30 shows the parts of Fig. 28 at a subsequent stage of operation at which the needle beard is closed by a presser edge and about to enter a yarn loop to cast the latter off;

Fig. 31 is a view of the parts of Fig. 29, as positioned when the parts of Fig. 30 are located as shown;

Fig. 32 is a view of the parts of Figs. 28 and 30, after the tip of the long beard has been caught under the loop to be cast off and has moved away from the presser edge;

Fig. 33 is a view of the parts of Figs. 29 and 31, as positioned when the parts of Fig. 32 are as shown;

Fig. 34 is a view of the parts of Figs. 28, 30 and 32, after further departure of the beard from the presser edge, and further descent of the needle toward casting off position;

Fig. 35 is a view of the parts of Figs. 29, 31 and 33, as positioned when the parts of Fig. 34 are as shown;

Figs. 36, 37 and 38 are diagrammatic perspective views showing successive stages in one machine of knitting fashioned heel tab inserts to the aforementioned full fashioned stocking blank, which is previously knitted on another machine;

Figs. 39, 40, 41 and 42 are enlarged diagrammatic perspective views of certain needles, transfer points, other yarn loop-manipulating implements, and loops, showing successive steps of operation in the production of the fabric; and Fig. 43 is a greatly magnified fabric and loop diagram of areas with which the invention is immediately concerned.

In the drawings and description, only those parts necessary to a complete understanding of the invention have been set forth; further information as to the construction and operation of other elements not herein specifically pointed out, but which are usual and well known, being available in the pamphlet entitled "Full Fashioned Knitting Machines," copyright 1920, and in the "Reading" Full Fashioned Knitting Machine Catalogues, copyright 1929 and 1935, and published by the Textile Machine Works, Reading, Pennsylvania, and in a pamphlet entitled "Knitting Machine Lectures," published in 1935 by the Wyomissing Polytechnic Institute, Wyomissing, Pennsylvania.

Referring to Fig. 1, one exemplary application of the method of the invention is in connection with a full fashioned stocking comprising a folded double layer welt portion W, a leg portion M, a reinforced upper heel area H, a reinforced sole area R, a diamond point toe portion T, and a heel pocket P.

In the production of the stocking of Fig. 1, the blank of Fig. 2 is first produced on a single machine, and comprises the welt portion W, the leg portion M narrowed at a knee area 12 and at a lower leg area 14, the upper reinforced heel areas H and the reinforced sole areas R at opposite sides of the blank, the diamond point toe portion T, a loose course 15 and a ravel area 16.

Between the areas H and R, at each side of the blank, are formed loose course portions 17 and 18 in walewise register, between which a severing course area 19 is formed. The course portions 18 may have a greater number of loops than the portions 17. By severing the courses 19, which is indicated as having been done in Fig. 16, to separate the areas H and R, by folding the blank about an instep course or line J, and again folding the blank about a walewise line at each side of the blank, as indicated in Fig. 17, and which will hereinafter be more fully explained, the courses 18 are removed from the initial walewise register thereof with the courses 17, as in Figs. 2 and 16, and the courses 17 and 18 placed in alignment with each other in different coursewise positions, as indicated in Fig. 17, for topping onto needle-like implements of the machine of the invention, to be herein set forth. The latter produces heel tabs E, as shown in Fig. 3, having a given number of course portions knitted from the course portions 17. The loops of the loose course portions 18, which, in the example given, are fewer in number than the course portions of the tabs, are transferred to, and interknit with, selected loops of the inside selvage edges of the tabs, distributed substantially throughout the length of the latter, although they might be of the same number transferred to each inner selvage edge loop of the tabs, or the tabs may have further courses after the last transferred loops of the courses 18. Also, the tabs E, in the example given, are narrowed in selected courses, fewer than the total number of courses in the tabs, disposed in predetermined positions along the tabs, although here also, considerable choice may be exercised in the number, kind and positions of the narrowings.

As indicated in Fig. 3, short loose courses 22 and ravel areas 23 are formed at the ends of the tabs for looping and stitching the courses 22 to each other, as shown in Fig. 1, in a series of loopings 24 extending along the line of the usual back seam for a short distance, indicated by a bracket, from the upper end of the reinforced sole area R for a short distance along the pocket. A short back seam 27 is formed between the selvages of the heel area R from the usual loopings of the toe portion T to the lower end of the heel pocket P, coincident with the lower end of the loopings 24, and a long back seam 28 is formed from the upper end of the loopings 24 to the top of the stocking; the long seam 28 thereby being formed for a short distance 29 between the outside selvage edges of the heel pocket halves.

Referring to Figs. 4, 5, 8, 13 and 14, one example of a machine, or selvage loop forming and connecting means, for practicing the method of the invention may be a modified multi-section "footer" machine, comprising usual end and center frames 32 and 33, respectively, supporting a front rail 34, a back rail 37, a front bed 38, and a center bed 39, to constitute a framework or base on which the operating parts of the machine are supported.

A cam shaft 42, supported in bearings in the frames 32 and 33, carries a needle presser cam 43, a needle bar cam 44, a narrowing head actuating cam 47 at each end of the machine, a narrowing lift cam 48, a pattern cam 49, shogging cams 52, and a face cam 53 for preventing operation of the narrowing mechanism.

The needle presser cam 43 operates a follower 54 on a rocker arm 57, and a needle bar fork 58 to impart the usual horizontal movement to a needle bar 59, and a follower 62 on a cam lever 63 is operated by the needle bar cam 44 to turn a needle bar lifting shaft 64 which transmits this motion through a needle bar lifting arm 67, a pivot pin 68, and a bracket 69, to the needle bar 59, thereby giving to the latter its usual lifting movement. Needles L, and other needle-like yarn loop-manipulating implements S, to be hereinafter more particularly pointed out, are held to the bar 59 by clamps 73.

The shogging cams 52 are operated in usual manner to shift the cam shaft 42 longitudinally, or axially, by longitudinal movement of a stub shaft 76 at right angles to the cam shaft, whereby a cam follower roller 77, on the stub shaft between the cams 52, in one position of the stub shaft, causes the cams 52 to shift the cam shaft 42 in one direction, and in another position of the stub shaft, causes the cams 52 to shift the cam shaft 42 in the opposite direction. In one position of the cam shaft, the needle presser cam 43 and the needle bar cam 44 are in active relation to the followers 54 and 62 thereof, respectively, to operate the needles, or loop-manipulating implements L, for knitting, and each narrowing cam 47 is in inactive relation to a follower 78 (Fig. 13) whereby no narrowings are effected. Conversely, in the other position of the cam shaft, the needle presser cam 43 and the needle bar cam 44 are in inactive relation to the followers 54 and 62, respectively, whereby no knitting takes place while each narrowing head actuating cam 47 is in active relation to its follower 78 to produce narrowings.

Each narrowing head actuating cam follower 78 is mounted by a pin 79 on a lever 80 that is pivotally mounted at one end to the machine frame by a shaft 82, and is pivotally connected adjacent to its other end, by a pin 83, to a lift lever 84 including a forked upper end having arms 87 and 88. A spring 75, connected between a hook portion 81 of the lever 80 and a stationary part of the machine frame, biases the lift lever downwardly against an adjustable stop screw 85 in a bracket 86 on the machine frame. The arm 87 carries a pawl (not shown) for operating a ratchet wheel that is disposed behind a locking wheel 92 (Fig. 13), and a pawl 93 for operating a ratchet wheel 94. The ratchet wheels are fixed to a yarn carrier or end stop spindle 97, with the locking wheel 92 fixed therebetween for cooperation with a spring-biased detent 98. The arm 88 carries a pawl 101 for operating a ratchet wheel 102 that is disposed behind a locking wheel 99 (Figs. 4 and 13), and a pawl 103 for back racking a ratchet wheel 104. The ratchet wheels 102 and 104 are fixed to a narrowing spindle 105, with the locking wheel 99 fixed therebetween for cooperation with a spring-biased detent 108. The pawls 93 and 101 are connected by a link 109. The spindle 105 includes portions 106 and 107 having screw threads reverse to each other. This mechanism is of usual construction for variably moving narrowing combs 112 and 113 of each section toward and away from each other to operate the points N thereof, and to vary the travel of carrier rods 5, 6, 7 and 8, each supporting a yarn carrier or guide finger Y (Fig. 5) in a usual manner. The bars 5—8 are mounted in brackets, like the bracket 110 of Fig. 5, secured to the center bed 39, and usual end stops 111 (Fig. 4) are provided for the bars at each end of the machine.

A sinker head and knockover bit assembly D (Fig. 5) is of usual construction comprising sinkers 114, dividers 115, knockover bits 116 (Figs. 28–35), and a presser edge 117; the sinkers of each section being operated by a slur cam 118 carried by a slur cock box 119 which is supported on a slide bar 122, and connected to cock boxes of the other sections and to operating means therefor by a slur cock box connecting bar 123.

A pattern control mechanism B (Figs. 4, 14 and 15) comprises a bracket 127, mounted on the front rail 34, having a bearing portion 128 for the stub shaft 76 which is biased toward the shogging cams 52 by a spring 129 connected at one end to the bearing portion 128 and at the other end to a member 131 on the stub shaft held against such bias by a lever 132. The member 131 carries a roller 133 which is engaged by one of the cams 52 to move the stub shaft against the action of the spring 129 to position in which it is held by the lever 132, the latter being actuated by a button on a pattern chain 134 whereby the cam shaft 42 is shogged as above mentioned. A hand lever 137 is associated with the mechanism B in a usual manner whereby the chain 134 may be adjusted along its path of movement by oscillating the lever 137 about the axis of a shaft 139 on which the lever and the drum are mounted. The drive means for the chain comprises a cam 140 (Fig. 14) on the cam shaft 42, a follower 142 for the cam 140, and a lever 143 carrying, at one end, the follower 142 and pivoted by a pin 144 to a portion of the bracket 127. The other end of the lever 143 operates against the action of a spring 147 to actuate a pawl which actuates a ratchet wheel 149 fixed to the drum 138.

The narrowing lift cam 48 has associated therewith a circular cam 152 and a follower 153 which, when the cam shaft 42 is shogged rides on either the cam 48 to effect the narrowing lift action, or on the cam 152 to avoid the narrowing lift action during ordinary knitting. This lift action is transmitted by the follower 153, through a pivot pin 154 and a narrowing lift cam lever 157, to a vertical narrowing lift lever 158 that is pivoted to the lever 157 by a pin 159; the lever 157 being pivotally mounted on the machine frame by a pin 162.

The vertical lever 158 is pivotally connected at its upper end to a front narrowing shaft 163 extending along the machine and carried by guide arms 164 (Figs. 4, 5 and 13) that are pivotally mounted on a back narrowing shaft 168 journaled in bearing bracket 169 on the machine frame. Narrowing rod brackets 172, fixed to the front narrowing shaft 163, support narrowing rods 173 and 174, and transfer rods 177 and 178, which are held in position on the brackets 172 by flat plate covers 179; the narrowing combs 112 and 113 of each knitting section being mounted on the narrowing rods 173 and 174, respectively. Transfer combs 182 and 183, having transfer points F, are carried by the transfer rods 177 and 178, respectively. As viewed in Fig. 4, a spring 184, extending between one of the brackets 172 and the transfer rod 178, biases the latter to the left, to a position against a slide cam to be hereinafter set forth and a spring 187, extending between another of the brackets 172 and the transfer rod 177, biases the latter to the right against the slide cam. Also, a spring 188, connected between the narrowing rod 174 and a narrowing nut 189 on the portion 107 of the spindle 105, biases the rod 174 to the right, to a position at which an adjustable contact screw 190 on the rod engages the nut 189, and a spring 192, connected between the narrowing rod 173 and a narrowing nut 193 on the portion 106 of the spindle 105, biases the rod 173 to the left, to a position at which a contact screw 191 on the rod 173 engages the nut 193; this structure being duplicated at the other end of the machine.

As thus set up, the transfer points F cooperate with groups of the needles or loop-manipulating implements S having short beards 194, and the narrowing points N cooperate with groups of the needles L having beards 195 of standard length which, since they are longer than the beards 194, will be referred to as long beards. All of the needles are held to the bar 59 by the clamps 73, as above set forth.

Shifting, or transferring, movement of the combs 182 and 183 is effected by a slide bar cam device K which, as better shown in Figs. 6 to 12, inclusive, is mounted in a bracket 198, similar to one of the brackets 169, on the front narrowing shaft 163. Instead of the flat plate cover 179 of the bracket 169, the bracket 198 has a member 199 of rectangular channel section, the bottom wall 202 of which takes the place of the flat plate cover 179, and the bottom and sides of which constitute guides for a slide cam bar 203 of rectangular cross section, longitudinally slidably fitting the channel of the member 199. The cam bar 203 is held in place laterally by a cover 204 which is removed from position in Figs. 6 and 7, but is in place in Figs. 8 to 12, inclusive, and has edge cut-outs 207, in register with side cut-outs 208 of the member 199, to accommodate the heads 209 of screws 211 and 212, on the transfer bars 177 and 178, respectively, and acting as followers for the cam bar 203. The screws 211 and 212 are biased toward each other against the cam bar 203 by the springs 187 and 184, respectively, connected from the transfer bars 177 and 178 to certain of the brackets 172 on the front narrowing shaft 163, as hereinabove set forth. The cam bar 203 has sides slidably engaging the sides of the member 199 constituting high points of the cam surfaces of the bar, and side recesses 213 constituting low points of the cam surfaces of the bar, and, in an upper portion protruding from the top of the member 199, has a pin 214 projecting laterally from one side thereof.

The screw 211 is mounted in an arm 217 of a member 218 secured to the transfer bar 177, and, with the latter, forms a slot 219 (Fig. 12) through which one of the narrowing combs 113 extends. Similarly, the screw 212 is mounted in an arm 222 of a member 223 secured to the transfer bar 178, but the corresponding slot 224 is not utilized as in the case of the member 218, because the narrowing comb 112 adjacent thereto is disposed entirely below the slot; this feature resulting from the fact that it is of manufacturing advantage to make the members 218 and 223 duplicates, and renders them interchangeable.

The pin 214 is laterally slidably and pivotally disposed between the arms of a fork lever 227 that is fixed to the front narrowing shaft 163. The lever 227 has another arm 228 pivotally connected by a pin 229 to one end of a link 232 of substantially C-shape, the other end of which is similarly connected by a pin 233 (Fig. 5) to a bearing bracket or lever 234 on the back narrowing shaft 168. A link rod 237 is connected at one end by a pivot pin 238 to the bracket lever 234 and, at the other end, by a pivot pin 239, to one end of a lever 242. The latter is pivotally mounted at an intermediate position, by a pin 243, on a bracket 244 on the back rail 37, and rotatably carries, at its other end on a shaft 247, a follower roller 248 for cooperation with the cam 49, and a circular cam 249 associated therewith. The lever 242 is biased counterclockwise, as viewed in Fig. 5, by a spring 252 extending between a hook portion 253 on the lever and a bracket 254 on the back rail 37; this arrangement tending to hold the follower 248 against one of the cams 49 and 249, depending upon which of the latter is opposite the follower as determined by the axial position of the cam shaft 42. The cam 49 has a low point of substantially the radius of the circular cam 249 whereby the cams may shift relative to the follower 248, and the cam 49 has a high point whereby, at each revolution of the cam shaft, when the roller 248 is on the cam 49, the lever 242 is oscillated clockwise about its pivot shaft 243. This movement rocks the bracket lever 234 clockwise about the back narrowing shaft 168 and, through the C-shaped link 232, causes the fork lever, by engagement with the pin 214, to move the sliding cam bar 203 downwardly, as viewed in Fig. 7. Before this downward movement, the cam bar 203 is in the upper position of Figs. 6, 8, 9, 11, and 12, in which the screws 211 and 212 are on the low points of the cam, and the transfer combs 182 and 183, of each adjacent pair thereof at each knitting section, are at the positions nearest to each other. The downward movement of the cam bar 203 changes the position thereof, from that of Figs. 6, 8, 9, 11, and 12, to the position of Figs. 7 and 10, in which the screws 211 and 212 are on the high points of the cam bar, and the transfer combs have each been moved a distance of one needle, causing the combs to be moved away from each other by a distance of two needles.

Dipping movement of the transfer points F, and of the narrowing points N, is effected when one of a selection of buttons on the pattern chain 134 causes operation of the lever 132 to release the stub shaft 76, whereby the roller 77 is moved, to position between the shogging cams 52, to shift the cam shaft 42. This shifting moves the needle presser cam 43 and the needle bar cam 44 away from the followers 54 and 62, respectively, to temporarily prevent the formation of new loops. The shifting action also moves the circular cam 152 away from the follower 153, and the narrowing cam 48 into engagement with the follower 153, to cause the dipping movement of the front narrowing shaft 163 and the parts mounted thereon. During this action, the narrowing cam 47, even though shifted, does not engage the narrowing cam follower 78, which, as hereinafter described, must also be shifted to engage the cam 47, so that the shifting or longitudinal narrowing movement of the narrowing points N may occur.

Thus, as so far described, the dipping movement is effected as above set forth, the transfer action of the points F is effected through the intermediary of the slide cam 203, the fork lever 227, the link 232, the bracket lever 234, the link rod 237, the lever 242, the follower 246, and the cam 49, and no narrowing occurs. The narrowing points dip, but they do not shift any loops.

In the production of the fabric in the example given, to be further set forth, there is a certain numerical relation between the number of courses knitted, the number of loops transferred and the number of narrowings effected; the number of courses knitted being the greatest, and on the order of ninety, the number of loops to be transferred being next, and on the order of sixty, and the number of narrowings to be effected being the smallest, and on the order of ten; the sixty transfers being substantially uniformly distributed walewise of the ninety courses.

Although narrowing could be effected when not transferring, in view of the above relations, the machine has been devised to effect each of the ten narrowings when one of the sixty transfers is taking place along the ninety courses.

It having been shown above how a transfer takes place without a narrowing, in order to transfer and narrow at the same time, thereby in certain instances taking advantage of one dipping action to effect both results, a mechanism is provided, as shown in Figs. 4, 14 and 15. This mechanism comprises a projection 257 on the lever 132 for operation by a lever 258 which is actuated by a button on the pattern chain 134. Pivotally mounted on a shaft 262, with the lever 132, is a lever 263 operated by a button on the pattern chain 134. The lever 263 is connected, by a rod 264 and a swivel connector 265, to a latch arm 267 which controls the descent of a follower roller 268 into operative engagement with the face cam 53 mounted on the cam shaft 42. When a button on the chain 134 raises the lever 258, the latter engages the projection 257 to raise the lever 132, without operating the lever 263. This action releases the stub shaft 76 for effecting a transfer, without narrowing. When a button on the chain 134 engages the lever 263, to shift the rod 264, the lever 263 also raises the lever 132 to release the stub shaft 76 to effect transfer and narrowing at the same time.

The latch arm 267 is pivotally mounted, by a pin 273, in a bracket 274 on the machine frame and has, at its upper end, a latch portion 277 for holding and releasing a fork portion 278 of a lever 279. The fork portion 278 embraces a stationary vertical guide rod 282 whereby the follower 268 may be moved by the face cam 53 back and forth in the direction of the cam shaft 42 and the latch end, or fork portion, 278 remains in the vicinity of the latch portion 277 of the arm 267 for latching cooperation therewith. The lever 279 is pivotally connected by a vertical pin 283, to a forked end 284 of a swing arm 287 which carries the follower 268 on a pivot shaft 288, and also carries, on a pin 289, a roller follower 292 for engagement with a perimetral cam portion 293 of the face cam 53 for moving the swing arm 287 upwardly to disengage the follower 268 from the face cam, and permit it to be latched in upper position by the latch arm 267. The swing arm 287 is pivotally mounted for up and down movement, by a horizontal pin 294, and biased downwardly by a spring 297 extending between a hook portion 298 on the arm 287 and a portion of the machine frame. The horizontal pin 294 is mounted near the pivot end of a lever 299 that is pivotally mounted by a vertical pin 302 in a bracket 303 on the back rail 37, so that the swing arm 287 thereby has both vertical and horizontal movement.

The lever 299 has a bifurcate end 304 which embraces one end of a vertical lever 307 that is pivotally mounted on the bracket 303, by a horizontal pin 308, and has a lower end 309 between collars 312 on a rod 314 whereby pivotal movement of the lever 307 imparts longitudinal movement to the rod 314.

The rod 314 also carries collars 317 (Figs. 4 and 13) between which one end 318 of a lever 319 is disposed, whereby rectilinear movement of the rod 314 causes pivotal movement of the lever 319 about its pivot pin 322. The other end 323 of the lever 319 is of flat-prong fork shape closely embracing the follower 78 for shifting it along its pin 79 relative to the lever 80 and to the narrowing cam 47.

Thus, while effecting transfers, without narrowing, the pattern chain 134, by operation of the lever 258, operates only the lever 132 to shog the cam shaft 42 to position in which the formation of new loops is temporarily prevented, the dipping movement of the front narrowing shaft 163 and associated parts is effected, and the shifting of the transfer combs 182 and 183 occurs, but the narrowing combs 112 and 113 do not shift, because the latch arm 267 and associate parts are not operated. However, to effect both transfer and narrowing action with the same dipping action, the pattern chain 134 operates the lever 263, as above set forth, or both levers 263 and 258.

In operation, for producing a full fashioned stocking blank, as hereinbefore indicated, nearly all of the blank, that is, all of it except the heel pocket set forth, and shown in Fig. 1, is formed on a machine that is not a part of this invention, except as a means for practicing a step or steps of the method producing the fabric. The course or courses 19 at each side of the blank of Fig. 2 are severed, as shown in Fig. 16, the fabric between the course J and the toe tip is folded about a coursewise line at about the course J, and the coursewise folded portion is again folded at each side about a walewise line near the inner ends of the adjacent severed portions, to the positions of the fabric parts of Fig. 17. As thus folded, the course portions 17 and 18, which were in walewise register when first produced in the blank of Figs. 2 and 16, are now in coursewise alignment, or in different coursewise positions from those originally occupied. The above-mentioned manipulation, including the coursewise and walewise folding of the blank and its topping onto the needles and needle-like implements, is indicated in the example given, as performed by hand, although it may, by various degrees of completeness, be performed by the aid of tools and mechanisms. A portion of the blank above the instep course J (shown below it in the figures), when the courses 17 and 18 are topped onto the needles or loop-manipulating implements of the machine of the invention and the fabric tension applied, assumes a shape somewhat similar to that of Fig. 17, with an edge 327 curved between parts corresponding to the outer ends of the course J and the inner ends of the severing courses 19, as seen in Fig. 16.

As shown in Fig. 22, the loose loops of the course portions 17 are topped onto the needles L of standard or long beard length, and the loose loops of the course portions 18 are topped onto the implements having beards of short length; the fabric being then in the general shape and position indicated in Figs. 17 and 36, ready for the further operations of the invention.

In the next step of the method, or the first step by the machine after the fabric is mounted thereon, yarn is laid to each group of the long beard needles, and interknitted thereby to the course portion 17, to form a course portion 328 (Fig. 39), but, since no yarn is laid to the associated short beard implement group, the loops of the course portion 18 will be moved out of coursewise alignment with the course portion 17, and into such alignment with the new course portion 328, as shown in Figs. 23 and 39, ready for pick up, by the points F thereabove, to complete the first transfer, as indicated in Figs. 18 and 41.

During the above-mentioned action, the cyclic movement of the needles and loop-manipulating implements, indicated by Figs. 28 to 35, inclusive, occurs. In Fig. 28, each long beard needle L has partially descended to place a new loop under the beard. At the same instant, each short beard needle-like loop-manipulating implement S is located, as in Fig. 29, with no new loop on it.

In Fig. 30, the long beard needle has further descended to close its beard 195 by engagement of the beard with the presser edge 117, and the closed beard is just about to enter the old loop. In Fig. 31, although the beard 194 of the short beard implement S may be partially closed, by reason of its length, in the cycle of needle movement, it will be fully open again well before it can enter its loop, as the long beard of Fig. 30 is about to do.

In Fig. 32, the long beard has been caught under, and held closed by, the old loop, as well as having been moved away from the presser edge 117, and in Fig. 33, at the same instant, the short beard is fully open, well before it could enter the old loop.

In Fig. 34, the long beard is further on its way down to cast off the old loop, while in Fig. 35, the open short beard is safely beyond its old loop, and in no danger of casting it off.

To assist the above action, as illustrated by comparison with a standard needle in Figs. 24, 25, 26 and 27, the short beard implement has a tip portion 324, which although tilted toward the implement shank is tilted less than a tip 325 of the long beard, and a tapered inner longitudinal surface 330 which is 0.312 inch long and has 0.031 inch greater length, or downward extent toward the butt end 335 of the implement than the corresponding usual 0.281 inch tapered surface 331 on the standard or long beard needle toward its butt end 336. This feature is provided so that, as the implement moves away from the presser edge, the loop will be on a tapered surface, and farther from the beard tip, to further ensure the passing of the loop beneath the short beard. The movement of the implement is at such speed that, with the loop of the short beard implement on a cylindrical portion of the shank close to the point at which the beard tip is opposite the loop, the loop might not follow the taper fast enough to avoid passing outside the beard. By the longer taper therefore, the loop has a better opportunity to recede from the beard tip. The smaller tilt of the short beard tip also assists in preventing the tip from entering the loop; the tilt being provided to enable the beard to rise past the presser edge and avoid point contact therewith. The implements S and L are of the same length and shank diameter, and, in the examples given, which are of standard forty-five gage, the length is 1.713 inches, and the diameter near the bottom of the straight part of the grooves G is 0.022 inch. The beard length of the implement S is 0.185 inch, and the beard length of the implement L is 0.281 inch; the depth of the groove G, near the bottom of the straight part thereof, being 0.014 inch in each case. In implements of this type of a well known standard make, as heretofore constructed, the diameters of the shanks vary from 0.017 inch in a sixty gage needle or implement, to 0.0263 inch in a thirty-six gage needle or implement of the same relative beard and sloping surface lengths. The overall lengths vary between the same gages from 1.7105 inches to 1.7151 inches. The shortest beard ever heretofore provided on a standard needle, so far as I am aware, has been 0.232 inch, so that the short beard hereof, by its 0.185 inch length, is substantially shorter than the shortest previously known standard beard. The partial closure of the short beard, in the above action, is incident to the retention of the standard presser edge 117. By reducing the presser edge opposite the position of each short beard implement, the short beard may remain open during the loop forming cycle of the long beard needles, and a standard needle or implement may be employed in the place of each short beard needle.

As shown in Fig. 40, the points F have descended to cover, and partially close, the short beards 194, and are disposed in the corresponding loops of the course portion 18; the partial closure of the beards, in this instance also, being incident to the main purpose of taking off the loops upon rise of the points F from the position of Fig. 40. After the loops have been thus lifted, the action of the slide cam bar 203, above described, takes place whereby to shift the points and the loops a one-needle distance to a position above the position of the points of Fig. 41, from which they are lowered, or dipped, to the position of that figure for depositing the first loop 329 at one end of the course portion 18 on the first needle 332 in the next adjacent group of long beard needles.

Fig. 42 shows the needle-like implements elevated with respect to the positions thereof of Fig. 41, and the points F lifted therefrom and shifted back a one-needle distance, ready for the next transfer.

The operation, after the above-described initial steps, may be varied considerably as to which courses of loops formed on the long beard needle groups shall be narrowed, and to which the loops on the short beard implements shall be transferred. However, in the example given, the next transfer operation takes place after the knitting of one or two courses, and the ratio maintained of approximately two transfers in every three courses to the end of the heel tabs.

The narrowings do not begin, in the example given, until after about half of each heel tab has been knitted, when the ten narrowings above referred to are inserted in the remaining forty-five courses such that the first five narrowings are inserted one in every fifth course and the next five narrowings are inserted one in every fourth course, or irrespective of the number of courses through which they are distributed, are effected in a general arrangement like this, to the end of the heel tab.

Figs. 19 and 37 show the progress of the tabs E at an intermediate stage of production, Fig. 20 shows the completion of the tabs, and Figs. 21 and 38 show the finish of operations, with the ravel areas 23 produced by ordinary knitting, after all of the transfers and narrowings have been effected.

As illustrated in Figs. 36, 37 and 38, the larger portion of the folded-over toe end of the blank rests on a leg portion, but parts adjacent to the transferring and knitting action are maintained under a slight tension, as by hooks 333, cords 334 extending under the blank and a small weight member 337 hanging on the front edge of the front bed 38, merely to maintain the folded portions in some kind of regular position, and not allow them to move about irregularly, and to have enough tension on the short beard implements to ensure regular transfer action and to prevent displacement of the loops.

Also, as shown in Figs. 36, 37 and 38, the upper part of the blank, or portion between the courses 17 and the top edge of the welt portion, is tensioned and wound on a draw off reel 338 in a usual manner.

Fig. 43 indicates closely the loop formations and approximately right angularly related wales of the heel tab and sole areas as formed and joined by the selvage loop forming and connecting means above set forth.

Of course, the improvements specifically shown and described by which I obtain the above results, can be changed and modified in various ways without departing from the invention herein disclosed and hereinafter claimed.

I claim:

1. A heeler machine having four coplanar point carrying combs per needle or knitting section and four rods, one for operating a given comb for each section, a pair of said rods arranged to operate combs for moving selvage loops inwardly and a pair of said rods arranged to operate combs for moving interior fabric loops outwardly, a shaft pivotally mounted for carrying all said rods down and up, narrowing nuts for moving said first pair of rods to carry a comb on one rod of such pair toward a comb on the other rod of the pair, and means actuated by movement of said shaft for moving said second pair of rods to carry a comb on one rod of such pair away from a comb on the other rod of the pair and to return the combs on such pair to their original positions.

2. A heeler machine having four coplanar point carrying combs per needle or knitting section and four rods, one for operating a given comb for each section, a pair of said rods arranged to operate combs for moving selvage loops inwardly and a pair of said rods arranged to operate combs for moving interior fabric loops outwardly, a shaft pivotally mounted for carrying all of said rods down and up, narrowing nuts for moving said first pair of rods to carry a comb on one of the first pair of rods toward a comb on the other rod of the pair, and means including a cam bar and springs acting upon a down and up movement of said shaft for moving said second pair of rods to carry a comb on one of the second pair of rods away from a comb on the other rod of the pair and to return said second pair of rods and the combs thereon to their original positions.

3. In combination in a full fashioned knitting machine, a cam shaft, a pattern device, a needle bar, groups of standard needles of the beard type on the needle bar to receive a course of loops at each side of the blank to which heel tabs are to be knitted, groups of needle-like implements of the same bearded type having shorter beards also on said bar to receive other courses of loose loops adjacent to said first loop courses at each side of the blank, a presser edge, mechanism including means for actuating the needle bar to engage the standard needle beards to the presser edge to knit the heel tabs and preventing the forming of loops on said implements and the closing of said short beards at the time the needles cast off loops, a front narrowing shaft, brackets on said front narrowing shaft, means for narrowing in the heel tabs including narrowing rods supported by said brackets and a follower for cooperating with a cam on the cam shaft, means for transferring loops from said implements to the inside selvage edges of the heel tabs and causing the transferred loops to be interknitted with the selvage edge loops including transfer bar means supported by said brackets and a slide cam bar on the front narrowing shaft operated by the cam shaft transversely to the transfer bar means to simultaneously impart transfer movement to transfer bars in opposite directions, and means whereby the transferring means may be operated simultaneously with, and independently of, the narrowing means including means controlled by the pattern device for at one time shogging the cam shaft and shifting said follower and at another time shogging the cam shaft independently of the follower.

GUSTAV GASTRICH.